(12) United States Patent
Acharya Chandrashekar

(10) Patent No.: US 12,555,333 B2
(45) Date of Patent: Feb. 17, 2026

(54) DATA TRANSFER REDUCTION

(71) Applicant: International Business Machines Corporation, Armonk, NY (US)

(72) Inventor: Charan Acharya Chandrashekar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 197 days.

(21) Appl. No.: 18/380,775

(22) Filed: Oct. 17, 2023

(65) Prior Publication Data

US 2025/0124666 A1    Apr. 17, 2025

(51) Int. Cl.
*G06T 19/00*    (2011.01)

(52) U.S. Cl.
CPC .................. *G06T 19/006* (2013.01)

(58) Field of Classification Search
None
See application file for complete search history.

(56) References Cited

U.S. PATENT DOCUMENTS

| | | | |
|---|---|---|---|
| 10,699,491 B2 | 6/2020 | Pahud et al. | |
| 11,025,882 B2 | 6/2021 | Juang et al. | |
| 11,360,733 B2 | 6/2022 | Cardenas Gasca et al. | |
| 11,514,613 B2 | 11/2022 | Budagavi et al. | |
| 2020/0001180 A1* | 1/2020 | Turner | H04L 67/63 |
| 2020/0314046 A1 | 10/2020 | Jung | |
| 2022/0335693 A1 | 10/2022 | Matsuo et al. | |

FOREIGN PATENT DOCUMENTS

| | | |
|---|---|---|
| WO | 2019190278 A1 | 10/2019 |
| WO | 2019199104 A1 | 10/2019 |

OTHER PUBLICATIONS

Saran, C., "UCL collaborates with IBM to use virtual reality to tackle loneliness", https://www.computerweekly.com/news/252481271/UCL-collaborates-with-IBM-to-use-virtual-reality-to-tackle-loneliness, Published Apr. 7, 2020, 2 pages.
Huawei Lab, "Cloud VR Network Solution White Paper", https://www.huawei.com/minisite/pdf/ilab/cloud_vr_network_solution_white_paper_en.pdf, Accessed on Oct. 12, 2023, 58 pages.
Guinness, H., "Why Virtual Reality Needs Fiber Optic Internet", https://blog.frontier.com/2021/07/why-virtual-reality-needs-fiber-optic-internet, Jul. 12, 2021, 9 pages.

(Continued)

*Primary Examiner* — Robert J Craddock
(74) *Attorney, Agent, or Firm* — Scully, Scott, Murphy & Presser, P.C.; Gavin Giraud

(57) ABSTRACT

A computer server receives requests from a plurality of devices for digital content for rendering in a virtual computer environment. Based on geographic locations of the plurality of devices, the computer server groups the plurality of devices into at least one group. For a group in the at least one group, the computer server designate a device in the group as a local server, shares information associated with the device designated as the local server with other devices in the group, and transfers the digital content to the device designated as the local server for the device designated as the local server to share the digital content with the other devices in the group.

19 Claims, 7 Drawing Sheets

(56) References Cited

OTHER PUBLICATIONS

Disclosed Anonymously, "System and Method to Share Downloaded Content from One Smart Device to Another", An IP.com Prior Art Database Technical Disclosure, IP.com No. IPCOM000271522D, Dec. 31, 2022, 7 pages.
Microsoft, "Windows Update Delivery Optimization and privacy", https://support.microsoft.com/en-us/windows/windows-update-delivery-optimization-and-privacy-bf86a244-8f26-a3c7-a137-a43bfbe688e8#:~:text=Select%20Start%20%3E%20Settings%20%3E%20Windows%20Update,Devices%20on%20my%20local%20network, Accessed on Oct. 12, 2023, 3 pages.
Youtube, Airdrop vs Quick Share vs Nearby Share Speed Test—Which One is Faster? (S21 Ultra vs 12 Pro Max), https://youtu.be/84C_9nXq8uA, Mar. 28, 2021, 12 pages.
Geeks for Geeks, "Deletion in a Binary Tree", https://www.geeksforgeeks.org/deletion-binary-tree/, Last updated Jan. 17, 2023, 27 pages.
IBM, "Augmented and Virtual Reality Research at IBM Watson", https://researcher.watson.ibm.com/researcher/view_group.php?id=8071, Accessed on Oct. 12, 2023, 7 pages.

\* cited by examiner

DATA TRANSFER REDUCTION

BACKGROUND

The present application relates generally to computers and computer applications, and more particularly to reducing volume of data transferred from server to user device, such as augmented reality and/or virtual reality server to end user devices.

BRIEF SUMMARY

The summary of the disclosure is given to aid understanding of a computer system and method of data transfer reduction and not with an intent to limit the disclosure or the invention. It should be understood that various aspects and features of the disclosure may advantageously be used separately in some instances, or in combination with other aspects and features of the disclosure in other instances. Accordingly, variations and modifications may be made to the computer system and/or their method of operation to achieve different effects.

In some embodiments, a computer-implemented method includes receiving requests from a plurality of devices for digital content for rendering in a virtual computer environment. The computer-implemented method also includes, based on geographic locations of the plurality of devices, grouping the plurality of devices into at least one group. The computer-implemented method also includes, for a group in the at least one group, designating a device in the group as a local server, sharing information associated with the device designated as the local server with other devices in the group, and transferring the digital content to the device designated as the local server for the device designated as the local server to share the digital content with the other devices in the group.

In some embodiments, a system includes at least one processor. The system also includes at least one memory device coupled with the at least one processor. The at least one processor is configured to receive requests from a plurality of devices for digital content for rendering in a virtual computer environment. The at least one processor is also configured to, based on geographic locations of the plurality of devices, group the plurality of devices into at least one group. The at least one processor is also configured to, for a group in the at least one group, designate a device in the group as a local server, share information associated with the device designated as the local server with other devices in the group, and transfer the digital content to the device designated as the local server for the device designated as the local server to share the digital content with the other devices in the group.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
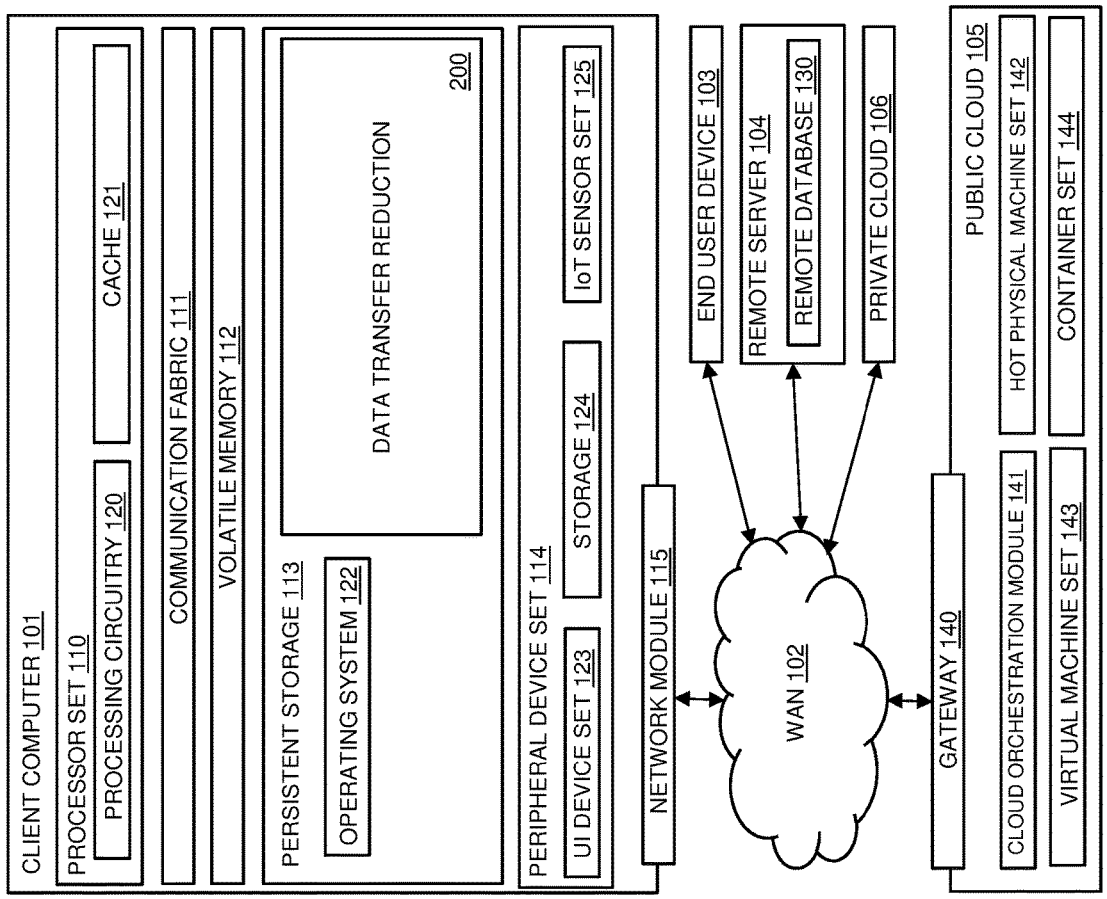
FIG. 1 shows an example of a computing environment, which can implement reducing volume of data in data transfer in some embodiments.

In some embodiments, a computer-implemented method includes receiving requests from a plurality of devices for digital content for rendering in a virtual computer environment. The computer-implemented method also includes, based on geographic locations of the plurality of devices, grouping the plurality of devices into at least one group. The computer-implemented method also includes, for a group in the at least one group, designating a device in the group as a local server, sharing information associated with the device designated as the local server with other devices in the group, and transferring the digital content to the device designated as the local server for the device designated as the local server to share the digital content with the other devices in the group.

The method can effect reducing amount of data transferred from a server computer to end user devices via a network connection such as the Internet, for example, thereby reducing network congestion caused by large amounts of data transferred over the Internet or over the connections between the server computer and end user devices. Devices with slow connectivity to the server computer can rely on a local server having better connectivity with the server computer than those devices.

One or more of the following features can be separable or optional from each other.

In some embodiments, the digital content includes augmented reality (AR) content. In this way, a user device can play AR for a user to experience AR.

In some embodiments, the digital content includes virtual reality (VR) content. In this way, a user device can play VR for a user to experience VR.

In some embodiments, the transferring of the digital content to the device designated as the local server includes, responsive to the other devices in the group establishing communication connections with the device designated as the local server, transferring the digital content to the device designated as the local server for the device designated as the local server to share the digital content with the other devices in the group. In this way, for example, server to user device data transfer can be reduced, as the server transfers data to one device in the group.

In some embodiments, the device and the other devices in the group are organized into a tree-structure having a root node and descendant nodes stemming from the root node, wherein the root node represents the device designated as the local server, and the transferring of the digital content to the device designated as the local server includes transferring the digital content to the device represented by the root node, for the device represented by the root node to transfer the digital content to devices designated as root node's direct descendant nodes for the root node's direct descendants nodes to further share the digital content, wherein the digital content is shared between nodes in the paths along the tree-structure. In this way, for example, the volume of data transferred from the local server can be further reduced.

In some embodiments, the tree-structure's depth is determined based on telecast delay among devices in the group. In this way, for example, optimal data transfer paths among the nodes can be established.

In some embodiments, the computer-implemented method further includes monitoring status of the device designated as the local server and responsive to detecting a problem with the device designated as the local server, designating another device in the group to act as the local server. In this way, for example, even when a problem occurs with the designated local server, the streaming or data transfer can be seamless without much interruption.

In some embodiment, the computer-implemented method includes performing the designating, the sharing and the transferring for each group in the at least one group. For example, more than one group can be formed, where there is a local server designated for receiving and distributing content.

In some embodiment, sharing of the information associated with the device designated as the local server with the other devices in the group further includes triggering the other devices in the group to establish communication connections with the device designated as the local server. In this way, for example, a processor allows the devices to be able to communicate among themselves.

In some embodiments, communication connections established between the device designated as the local server and at least one of the other devices in the group are non-Internet short-range communication connections and the digital content is shared via the non-Internet short-range communication connections. For example, even with weak Internet connection, multiple devices are able to receive and provide data content, for example, for AR and/or VR experiences.

In some embodiments, communication connections established between the device designated as the local server and at least one of the other devices in the group are intra-net connections. In this way, for example, local network communications can be established for providing AR and/or VR experiences.

In some embodiments, the device designated as the local server is designated based on the device's performance capability. In this way, for example, a device having best or ideal attributes for performing a given task (e.g., serving as a local server to communicate or stream content to the other devices) can be selected.

In some embodiments, the computer-implemented method further includes allowing devices in the group to directly request the digital content. In this way, for example, in case of a local server not functioning as intended, data can still be streamed to the devices in the group without much interruption in a seamless manner.

A system including at least one computer processor and at least one memory device coupled with the at least one computer processor is also disclosed, where the at least one computer processor is configured to perform one or more methods described above. A computer program product is also disclosed that includes a computer readable storage medium having program instructions embodied therewith, where the program instructions are readable by a device to cause the device to perform one or more methods described above.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as data transfer reduction algorithm code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Augmented reality (AR) is a technology that superimposes digital content such as images, sounds, and videos onto the real world, for example, physical environment of the real world, enabling users to interact with both the physical and virtual environment. Virtual reality (VR) is a technology that creates a simulated environment that users can interact with using a VR headset or similar devices, and may provide a fully immersive experience that can replicate real-world scenarios or entirely new ones. Both AR and VR can include immersive technologies that aim to enhance user experience by creating a more interactive and engaging environment using digital content. Both AR and VR have applications in various fields such as gaming, education, healthcare, and entertainment.

For example, a group of users who are co-located, for example, in the same geographical location can be using AR and/or VR, for example, attending a technology conference. Although the content watched and/or experienced by those users is the same, each of the users' devices connects to AR and/or VR server and pulls the virtual content from the server. In general, VR video streaming should have a stable and relatively fast internet connection to ensure smooth playback and avoid buffering or lag. VR streaming also should have a high enough bandwidth, low latency, in addition to stable internet connection to ensure a smooth and seamless experience. Any interruptions or delays in data transfer can result in buffering, which can break the immersive experience. Systems, methods and techniques are disclosed in some embodiments that reduce the amount of data that is transferred from AR and/or VR server to a user device, which in turn helps in reducing the latency and uninterrupted play.

For instance, in some embodiments, a system and/or method reduces the amount of VR and/or AR data transferred from AR and/or VR server to co-located user devices. The system and/or method dynamically forms groups of co-located users accessing common AR and/or VR content. The system and/or method identifies and designates one of the devices in a group as local server. The system and/or method transfers AR and/or VR content from AR and/or VR server to the device designated as the local server. The local server shares the content with other devices, e.g., the rest of the devices in the group. For example, the system and/or method may cause or trigger the local server to share the content with the other devices in the group. The system and/or method monitors the local server's health and dynamically changes the group's local server, for example, if there is a need.

A server such as an AR and/or VR server receives requests from a plurality of users to watch common VR and/or AR content. The server determines co-located users, forms groups based on the proximity of the users and shares grouping information with user devices. The server determines characteristics of the devices. For example, the server determines network latency between the server and each of the devices in the group, each of the device's computing capability, each of the device's health status, and/or other attributes. The server selects one of the devices based on such characteristics, for example, designates one of the capable device as the local server in the group, to receive AR and/or VR content from the server. The server also shares this information (e.g., the selected device acting as a local server) with other devices, e.g., the rest of the devices, in the group. In this way, for example, the other devices in the group may pull the AR and/or VR content indirectly from the local server, thereby reducing the amount of data transfer between the server (e.g., AR and/or VR server) and the user devices. In some embodiments, the server continuously monitors the health and availability of the local server. Responsive to detecting a change in the status of the device serving as the local server (e.g., deterioration in performance, availability, and/or others), the server dynamically identifies a new local server. Information associated with the new local server is shared with other devices in the group. In some embodiments, a capability is provided to the other devices in the group to directly be able to pull content from the server, rather than indirectly through the local server. For example, non-local server devices in the group can directly reach the AR and/or VR server requesting for the content if there is an issue communicating with local server. In some embodiments, the system and/or method implements a tree-based sharing approach by having the server share the content to a device at the root node of a tree, the device at the root node sharing the content with devices at its immediate descendant nodes, and those devices at the immediate descendant nodes sharing the content with devices at their immediate descendant nodes, and so forth. In this schematic, the depth of the tree can be set based on telecast delay that can be absorbed. For example, the depth of the tree is set such that there is less than maximum delay in communications to the nodes that is permitted or sustained for seamless AR and/or VR experiences on devices represented by those nodes.

Figure 2:
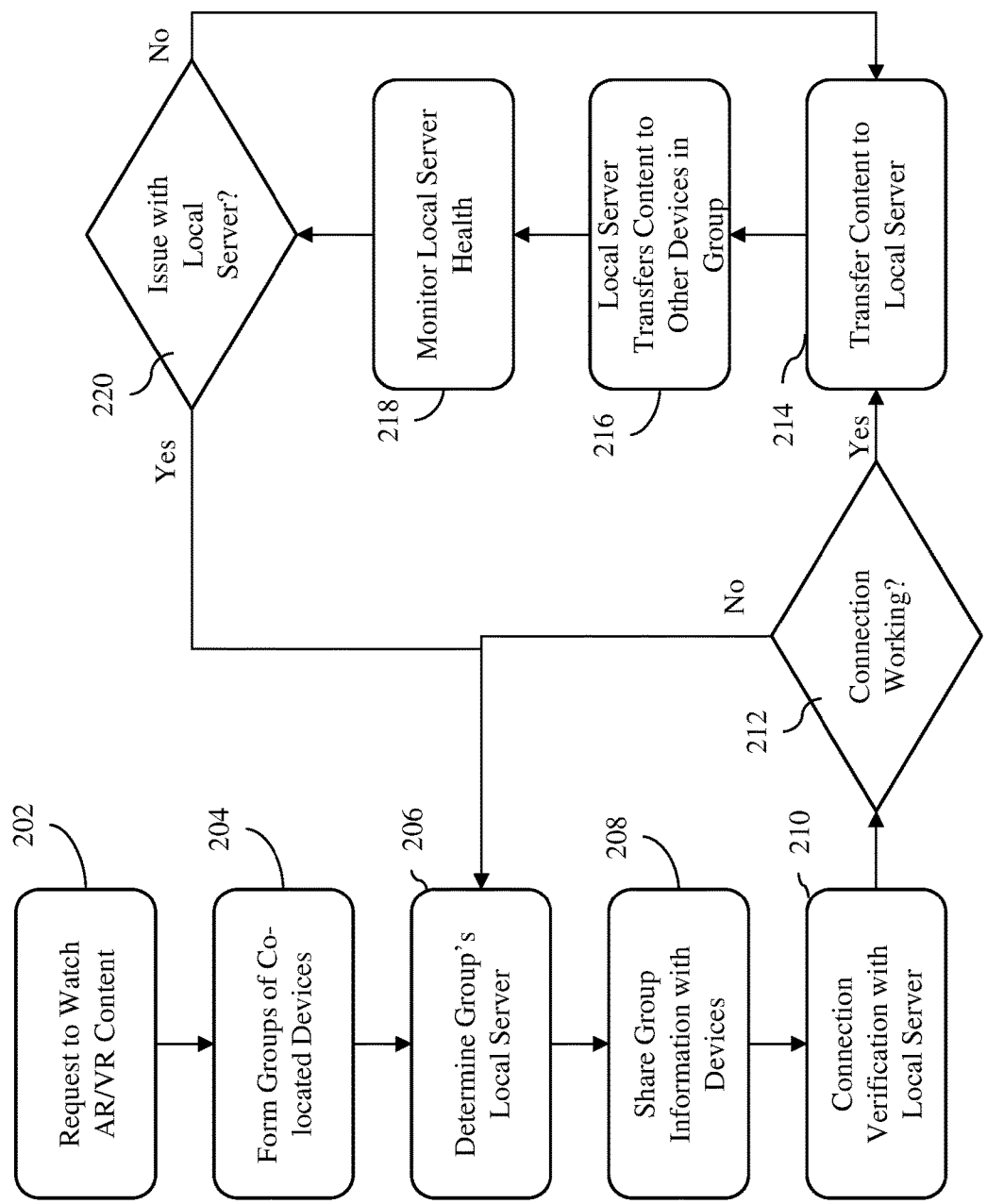
FIG. 2 is flow diagram illustrating a method of reducing volume of data transferred between a server and a user device in some embodiments.

FIG. 2 is flow diagram illustrating a method of reducing data transfer between a server and a user device in some embodiments. The method can be implemented on or performed by one or more computer processors, for example, but not limited to processors described with reference to FIG. 1. At 202, requests to watch content, for example, AR and/or VR content is received. Content such as AR and/or VR content can be 3-dimensional (3D) computer-generated image data such that 3D virtual images or video can be rendered on a user device. A server such as an AR and/or VR server receives such requests. For example, user devices send requests for AR and/or VR content for experiencing such virtual environments. For example, user devices send requests to an AR and/or VR server to stream AR and/or VR content. In some embodiments, not all the devices may send the request at the same time. For example, requests from devices can be received at different times.

At 204, the server, for example, AR and/or VR server determines co-located devices requesting and watching common content, and forms groups of co-located devices. By way of example, the server may determine location information of the devices based on Internet Protocol (IP) addresses, based on requesting location information from users of the devices (with an option given to the user to opt-out of providing such information), and/or based on another location identifying mechanism. Location devices such as Global Positioning System (GPS) can also be employed to determine location information of the devices, again based on permission from the user devices to be able to detect such information. All information accessed or received regarding user devices can be performed based on the respective users providing permission to use such information, e.g., giving the users options to opt-out. In some embodiments, optimal number of devices per group can be pre-defined, for example, based on the testing and/or by performing dynamic evaluation by considering device's available resources, number of connections a device can support, and other device attributes. For example, the server may request and receive such information from the devices. Devices can be determined to be co-located for the purposes of forming a group, for example, based on the devices being within a geographical distance range of one another, within a network communication range of one another, and/or using other parameters or boundaries. Such parameters or boundaries can be pre-defined.

In some embodiments, not all the devices may send the request at the same time. Devices sending requests at later point in time can be dynamically added to existing suitable group, if any. For example, the server may receive requests from devices at different times, and in response, the server may add the devices to one or more existing groups, for example, dynamically. If no suitable group is identified, the server may create a new group.

At 206, the server, for example, AR and/or VR server determines a local server in a group. For instance, for each group formed at 204, a local server to serve that group is determined. For example, attributes of the devices in a group can be checked to determine which device should serve as a local server for that group. For instance, network latency between the server and each of the devices, device temperature, battery available, software versions, memory space, number of connection that the device can support, and/or other information, can be checked to determine best available device in the group that can share content with other devices and that can be designated as local server of the group. For example, the server may perform such checks, requesting device information from the devices in the group. The server selects or designates the determined best available device as local server for the group.

In some embodiments, meta-data or additional information can also be stored in the devices to indicate the device history such as whether a device has served as local server in the past and information about the device performance. For example, each device may store its own history and performance information, which the server can request to receive.

At 208, responsive to designating a local server for a group, the server shares this information to the devices in the group. For instance, the server transmits to the devices in the group information about the designated local server. The server can provide communication address of the local server that can be used by other devices to request content. The server can also share an authorization token to authenticate and authorize the devices over one another. Mode of communication such as Wifi-Direct, Bluetooth, hotspot, and/or others, be used can also be provided.

At 210, the server requests or causes the devices in the group to check and verify their connections with the designated local server. In a scenario that a connection to the designated local server has problems, the next best available device in the group can be designated as the local server, and the verification can repeat until a local server that meets the connection criterion is designated. Connection criterion, for example, can be a threshold connecting latency, which can be pre-defined. In another aspect, the designated device can decline to act as the local server for the group, in which case, the next best available device can be designated. In another example scenario, if none of the device qualifies to be a local server, for example, because their capacities do not meet a criterion for acting as a local server, then devices can directly pull the data from the server, for example, without being a part of a group.

For example, at 212, it is determined whether the connection between the designated local server and other devices in the group, e.g., the rest of the devices in the group, are working, e.g., the devices are able to connect with sufficient or threshold network latency or speed. If the connection is not working, processing repeats at 206, where next available local server is searched for or determined. If the connection is working, processing proceeds to 214.

At 214, the server transfers the requested content to the local server, for the local server to share with the other, e.g., the rest of, the devices in the group that the local server is designated to serve. For example, the server streams the AR and/or VR content to the device designated as the local server.

At 216, content received by the local server is transferred to other devices in the group. For example, the local server can be caused to transmit the streaming content received from the server. As another example, the server may notify the devices in the group to begin streaming from the designated local server, causing the devices to receive streaming content from the local server. Communications between the devices can be performed using techniques such the Internet connection, WiFi connection, and/or others. By way of example, devices can share content between each other without using an Internet connection, for example, by using short range communication techniques such as Bluetooth, by using direct device-to-device communication, bypassing a router or access point such as WiFi-Direct, and/or others. Techniques that use Bluetooth as well as WiFi and/or Near Field Communication (NFC) to communicate between devices within a proximity range of one another can also be used. By way of example, it may take about 18 seconds to transfer 1 GB of data between devices using one or more of such techniques, where 7 seconds are used to initiate the connection.

In some embodiments, additional content are pre-downloaded for seamless and/or uninterrupted streaming. Pre-downloading additional content can provide some time to share and/or stream the content from one device to another. For example, if a user is watching the content at first minute of a video, content to third minute of the video can be downloaded to avoid buffering. To avoid or minimize any delay in other devices in receiving the content from the local server for seamless experiences, additional content can be downloaded to the local server, for the local server to share with other devices ahead of time.

In some embodiments, data transfer connection between local server and other devices, e.g., the rest of the devices, are established before data transfer of the content from the server to the device designated as the local server. Such data transfer connection is kept alive for the duration of the AR or VR experience. For example, once the data transfer connection is established between the local server and each of the devices in the group that are participating, the server transfers content to the local server, and the local server in turn shares the content to the other devices, e.g., the rest of the devices, in the group.

At 218, the server continuously or continually monitors the health and network latency of the local server, for example, how the local server is performing in distributing the content to the devices in the group. At 220, responsive to identifying a problem or issue with the local server, for example, its performance in sharing the content, processing proceeds to 206, where the server dynamically picks a new local server. Otherwise, the server continues at 214 to transfer content to the device designated as the local server. Processing shown at 206 to 220 can be performed for each of the groups formed at 204.

In some embodiments, the server selects or designates a new local server, for example, at 206, responsive to receiving a notification from the existing local server that it no longer desires to be designated as the local server (e.g., the user of the device may initiate such notification), detecting that the existing local server is no longer participating in AR and/or VR experience (e.g., the user of the device stopped watching the content and logged out), or for other reasons.

In some embodiments, at any point in time if a device is not able to pull the data (content) from its local server, then the device can immediately connect to the server (e.g., AR and/or VR server) and pull the required data directly from the server to ensure streaming is not interrupted. For example, the server accepts direct connection and data transfer requests from non-local server devices in the group, and transfers content to those devices directly.

Figure 3:
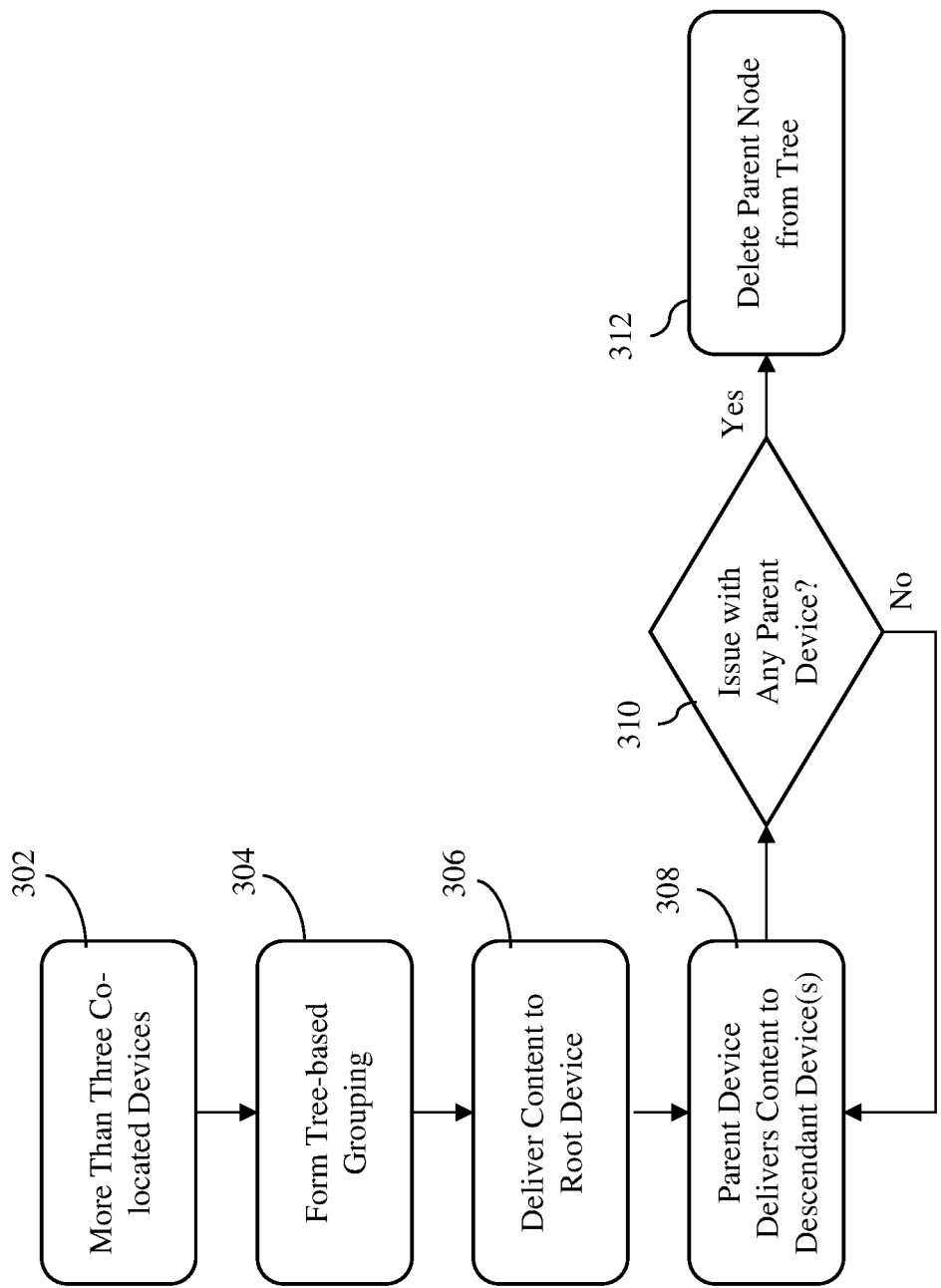
FIG. 3 is a flow diagram illustrating a method of establishing a tree-based sharing connection among a server and devices within a group of devices in some embodiments.

FIG. 3 is a flow diagram illustrating a method of establishing a tree-based sharing connection among the server and the devices within a group in some embodiments. The method can be implemented by and/or run on one or more computer processors, for example, but not limited to, those described with reference to FIG. 1. At 302, it is detected that there are more than tree co-located devices. For example, if there are more than three co-located devices watching or experiencing a common content, then a tree-based sharing approach can be implemented. At 304, a tree-based grouping can be formed. For example, a tree topology can be created based on the proximity between devices represented as nodes of a tree, where devices can have ancestor-descendant relationships. An example of a tree is binary tree. Different tree topology can be employed.

A server (e.g., AR and/or VR server) forms this tree-based grouping. By way of example, a device in the group nearest to the server can be designated as a root node of the tree. From the root node, devices nearest to the device designated as the root node can be designated as the root node's direct descendants. From those direct descendants, devices nearest to those direct descendants of the root node can be designated as direct descendants of the root node's direct descendants, and so forth. The depth of the tree can be predefined, such that not too many levels of nested sharing occur so as to deteriorate the data transfer performance. For example, the depth of the tree can be determined based on the delay in telecast that can be observed in data transferred from the server down to nodes on different levels of the tree. Sharing responsibility is divided between the devices in case of tree-based approach.

At 306, server (e.g., AR and/or VR server) delivers or transfer content to a device represented by the root node of the tree. At 308, the device represented by the root node delivers or transfers content to one or more devices designated as its direct descendants. That descendant device that in turn transfers or delivers content to one or more devices designated as its direct descendants, and so on, to the last node level of the tree (e.g., leaf nodes).

At 310, if a problem is detected with any device designated as parent node, at 312, that parent node can be removed or deleted (or marked as not participating in this group) from the tree. The tree can be reconfigured. For example, a new connection is made where any existing descendants of that node connects to a new parent node (e.g., grandparent node). In some embodiments, one of the descendant nodes of the removed node can be made a parent to other descendant nodes of the removed node. Devices represented by those affected nodes make new communication connections. Processing can continue at 308, where a device designated as a parent (ancestor) node delivers content to one or more devices designated as one or more descendant nodes.

Also at 310, if the device designated as a parent node is working properly, for example, there are no issues or problems with connecting to that device, then processing continues at 308, where a device designated as a parent (ancestor) node delivers content to one or more devices designated as one or more descendant nodes. In some embodiments, a known or existing node deletion in binary tree algorithm can be used to re-adjust the tree, for example, in cases where all the devices in the group are closely located and proximity is not a concern.

Figure 4:
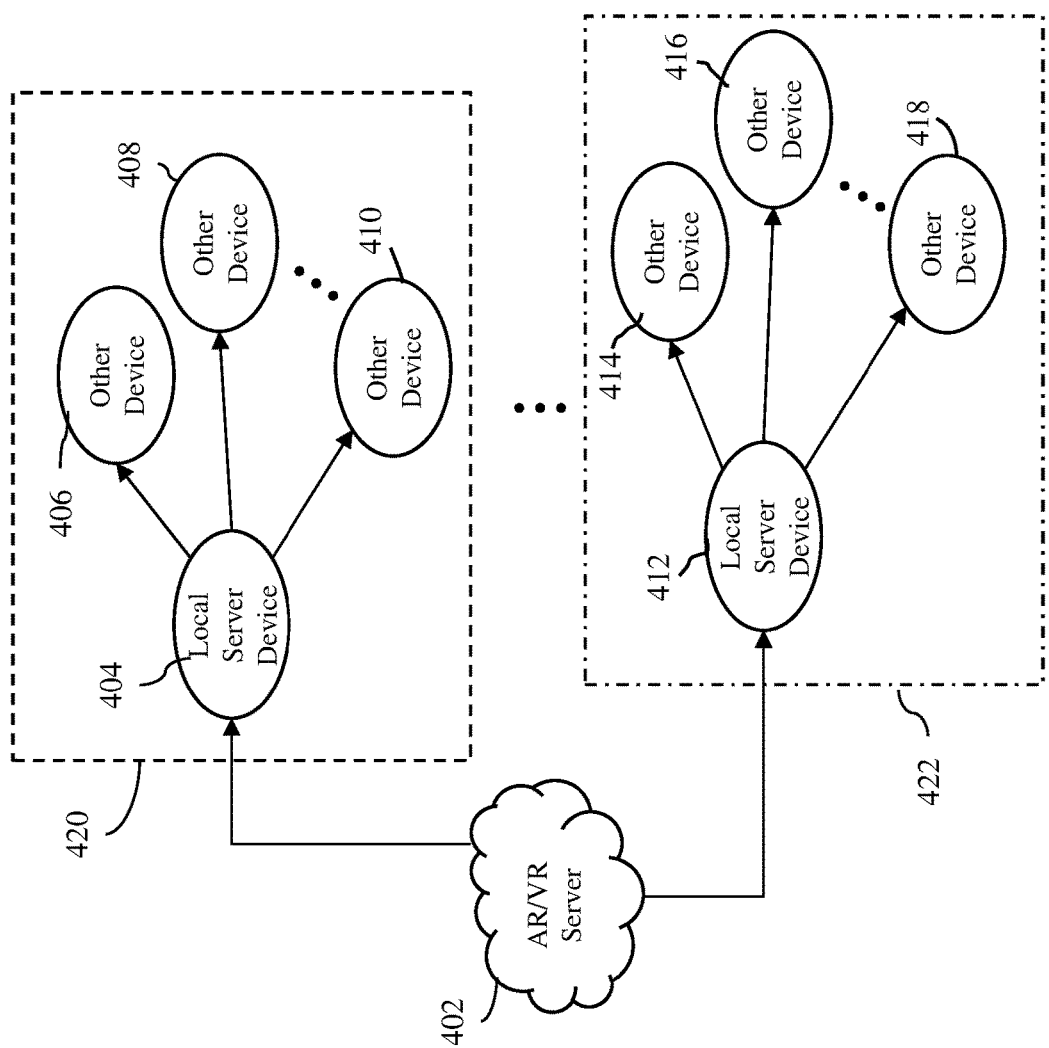
FIG. 4 is a diagram illustrating groups of devices where each group has a local server designated to serve its group in some embodiments.

FIG. 4 is a diagram illustrating groups of devices where each group has a local server designated to serve its group in some embodiments, for example, described with reference to FIG. 2. As described above, a server such as an AR and/or VR server 402 may designate a local server 404, 412 for each group 420, 422 of devices. Server 402 is a computer and can be a processor running in a cloud environment. For example, group 420 includes devices 404, 406, 408, 410, where device 404 acts as a local server; group 422 includes devices 412, 414, 416, 418, where device 412 acts as a local server. Once communication is established among the devices in each group, server 402 transfers data (content) to a designated local server 404, 406 in a group 420, 422. Designated local server 404, 406 communicates or transfers the received data (content) to other devices, e.g., the rest of the devices, in its group, e.g., local server 404 communicates data to devices 406, 408, 410, and local server 412 communicates data to devices 414, 416 and 418.

Figure 5:
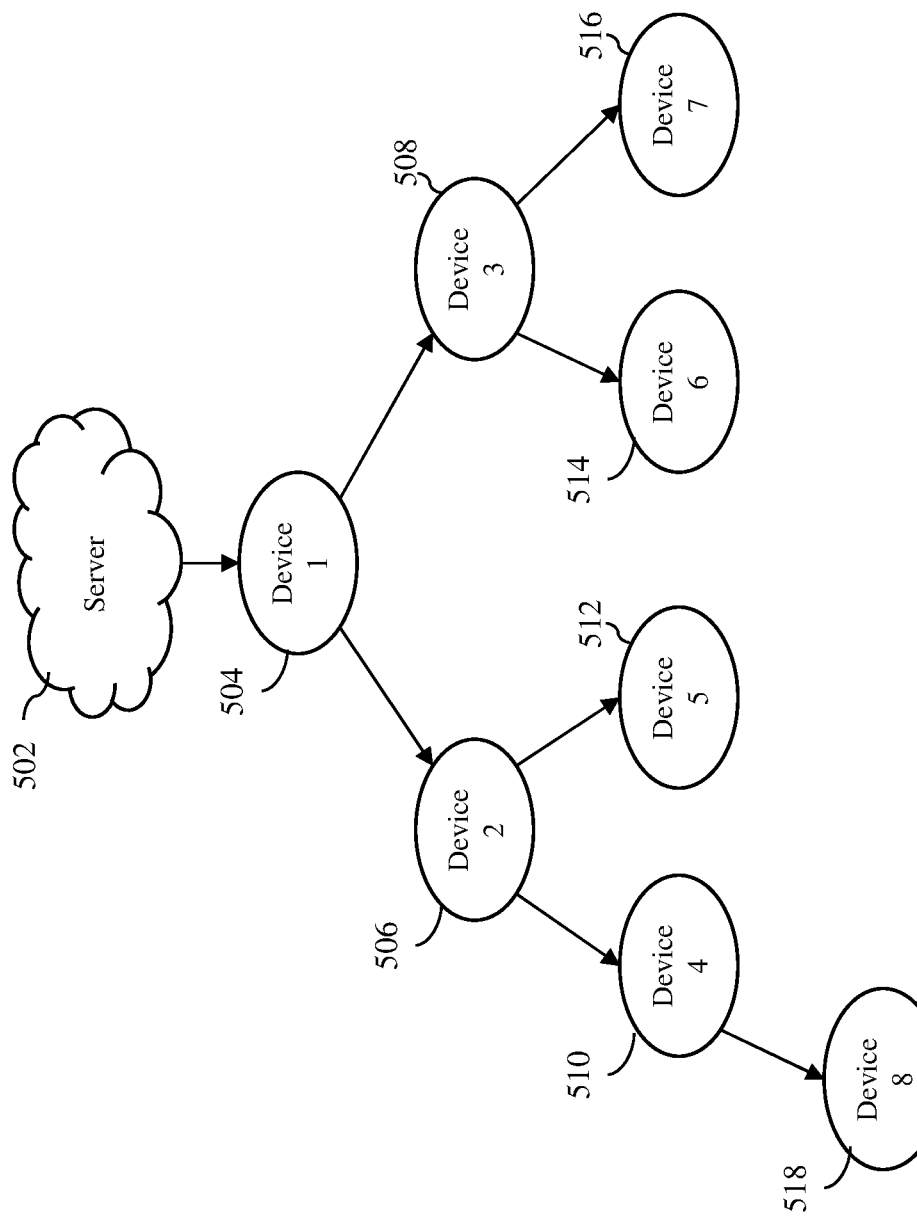
FIG. 5 is a diagram illustrating a tree grouping of devices in some embodiments.

FIG. 5 is a diagram illustrating a tree grouping of devices in some embodiments, for example, described with reference to FIG. 3. A tree topology with root node 504, its direct descendant nodes 506, 508, direct descendant nodes 510, 512 of node 506, direct descendant nodes 514, 516 of node 508, and direct descendant node 518 of node 510 can be generated or built. Each nodes represents a device in a group or grouping. In some embodiments, the group of devices 504-518 are formed based on their location proximity. In some embodiments, selection of the parent (ancestor)-descendant relationship can be based on the location proximity or connection proximity between the devices. Server 502 is a computer and can be a processor running in a cloud environment. Connections can be established between server 502, for example, an AR and/or VR server, and a device designated as the root node 504, between device at node 504 and device at node 506, between device at node 504 and device at node 508, between device at node 506 and device at node 510, between device at node 506 and device at node 512, between device at node 508 and device at node 514, between device at node 508 and device at node 516, and between device at node 510 and device at node 518, for example, parent-direct descendant communication connections. Server 502 transfers content to the device at root node 504, which in turn is transferred down the path of the tree nodes, for example, from 504 to 506 and 508, from 506 to 510 and 512, from 508 to 514 and 516, and from 510 to 518.

A system, method and technique disclosed herein can reduce amount of data transferred from a server computer to end user devices via a network connection such as the Internet. For example, the amount of such data transferred can be reduced by 66% if there are three co-located devices watching or experiencing common content. Further, in the technique described herein, not all the devices need to have an Internet connection, as some devices can communicate via intra-net or another type of communication connection. A system, method and technique disclosed herein also can reduce network congestion caused by a large amount of data transfer over the Internet. Further, devices with slow Internet connectivity can rely on a local server having better Internet connectivity than those devices.

A system, method and technique disclosed herein can be used in AR and/or VR games, applications such as augmented remote assist and augmented reality diagnostics, for example, in healthcare field, and/or other areas.

Figure 6:
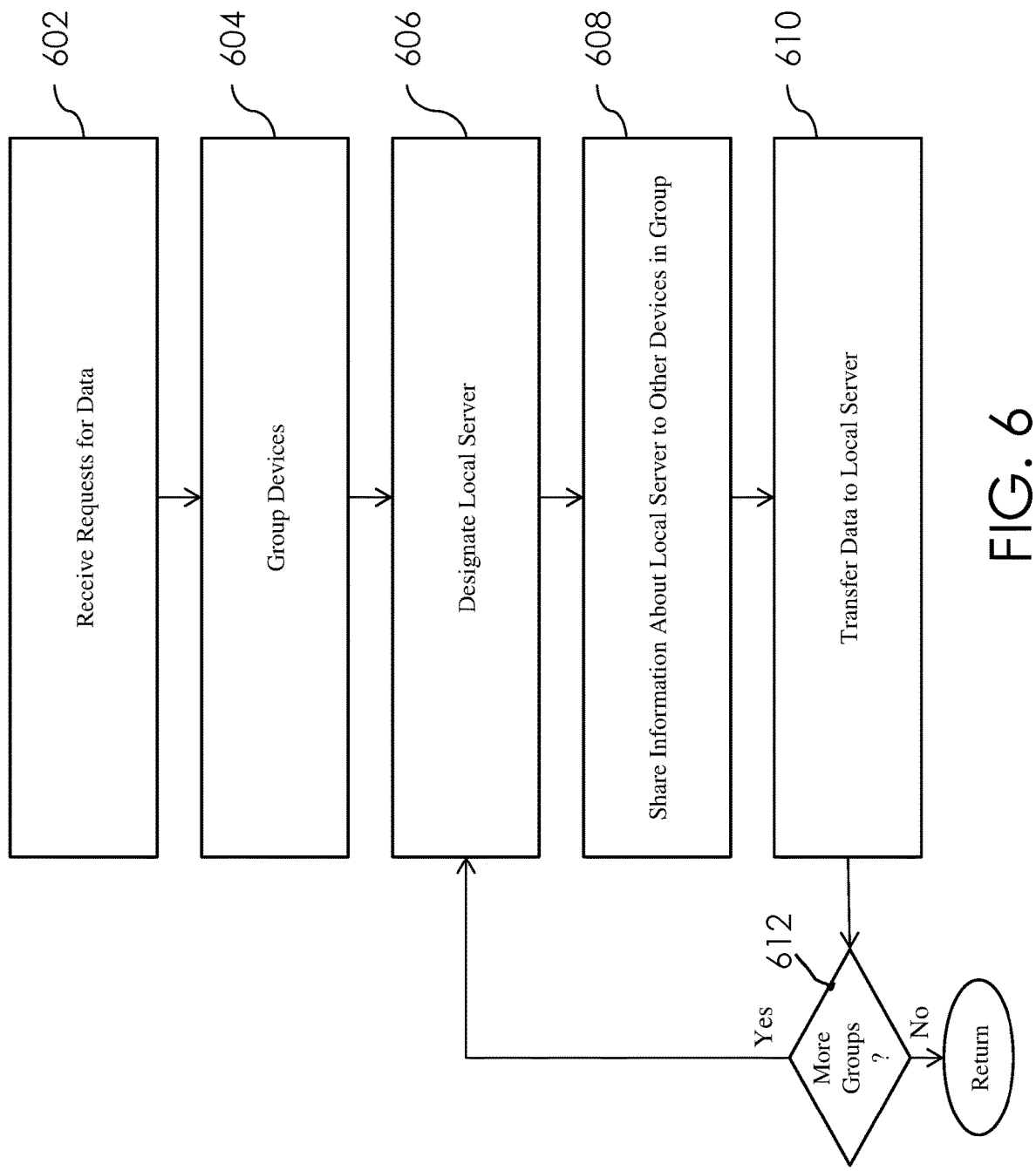
FIG. 6 is a flow diagram illustrating a method of reducing amount of data transfer in computer networks in an embodiment.

FIG. 6 is a flow diagram illustrating a method of reducing data transfer in computer networks in an embodiment. A processor such as a computer processor, e.g., acting as a server for AR and/or VR content can run the method. At 602, a processor receives requests from a plurality of devices for digital content for rendering in a virtual computer or computing environment. The plurality of devices can be user devices via which a user can experience a virtual world or an augmented reality world.

At 604, the processor, based on geographic locations of the plurality of devices, groups the plurality of devices into at least one group, e.g., one or more groups. For example, devices in a predefined proximity of one another can be grouped together.

Processing at 606, 608 and 610 can be performed for a group, for example, each group in the at least one group (one or more groups). At 606, the processor designates a device in the group as a local server. As described above with reference to FIG. 2, a local server device can be selected based on (or considering) the device's performance capability, for example, but not limited to, the device's network latency or speed, processor bandwidth capability, and/or other measures of the device's ability to perform data transferring (e.g., receiving and transmitting data) from and to other devices.

At 608, the processor shares information associated with the device designated as the local server with other devices, e.g., the rest of the devices, in the group. For example, information such as which device is selected as the local server and information needed in order for the other devices, e.g., the rest of the devices, in the group to communicate with that local server device (the device designated as the local server) can be provided.

At 610, the processor transfers the digital content to the device designated as the local server for the device designated as the local server to share the digital content with the other devices, e.g., the rest of the devices, in the group.

As described above, processing at 606, 608 and 610 can be performed for each of the groups. For example, at 612, if there are more groups of devices, processing of 606, 608 and 610 are performed again for the group. In some embodiments, processing of different groups of devices can be performed in parallel, for example, using parallel processing and/or by more than one processor. So for example, processing of the groups need not be done sequentially by one processor.

In some embodiments, the digital content includes augmented reality (AR) content. In this way, a user device can play AR for a user to experience AR. In some embodiments, the digital content includes virtual reality (VR) content. In this way, a user device can play VR for a user to experience VR.

In some embodiments, transferring of the digital content to the device designated as the local server at 610 includes, responsive to other devices in the group, e.g., the rest of the devices in the group, establishing communication connections with the device designated as the local server, transferring the digital content to the device designated as the local server for the device designated as the local server to share the digital content with the other devices, e.g., the rest of the devices, in the group. In this way, server to user device data transfer can be reduced, as the server transfers data to one device in the group.

In some embodiments, the device and the other devices, e.g., the rest of the devices, in the group are organized into a tree-structure having a root node and descendant nodes stemming from the root node, for example, as described above with reference to FIG. 3 and FIG. 5, where the root node represents the device designated as the local server, and transferring of the digital content to the device designated as the local server at 610 includes, transferring the digital content to the device represented by the root node, for the device represented by the root node to transfer the digital content to devices designated as root node's direct descendant nodes for the root node's direct descendants nodes to further share the digital content, wherein the digital content is shared between nodes in the paths along the tree-structure. In this way, for example, the volume of data transferred from the local server can be further reduced.

In some embodiments, the tree-structure's depth is determined based on observed telecast delay among devices in the group. In this way, optimal data transfer paths among the nodes can be established.

In some embodiments, a processor monitors status of the device designated as the local server and responsive to detecting a problem with the device designated as the local server, the processor designates another device in the group to act as the local server. In this way, for example, even when a problem occurs with the designated local server, the streaming or data transfer can be seamless without much interruption.

In some embodiments, sharing of the information associated with the device designated as the local server with other devices in the group, e.g., the rest of the devices in the group, further includes triggering the other devices, e.g., the rest of the devices, in the group to establish communication connections with the device designated as the local server. In this way, for example, a processor allows the devices to be able to communicate among themselves.

In some embodiments, the communication connections established between the device designated as the local server and at least one of the other devices in the group, e.g., the rest of the devices in the group, are non-Internet short-range communication connections. For example, even with weak Internet connection, multiple devices are able to receive and provide data content, for example, for AR and/or VR experiences.

In some embodiments, the communication connections established between the device designated as the local server and at least one other device in the group, e.g., at least one of the rest of the devices in the group, are Bluetooth connections. In this way, a specific known protocol can be used for short range communications between the devices.

In some embodiments, the communication connections established between the device designated as the local server and at least one other device in the group, e.g., at least one of the rest of the devices in the group, are WiFi-Direct connections. In this way, more protocol options for communicating between the devices can be arranged.

In some embodiments, the communication connections established between the device designated as the local server and at least one other device in the group, e.g., at least one of the rest of the devices in the group, are intra-net connections. In this way, for example, local network communications can be established for providing AR and/or VR experiences.

In some embodiments, the device designated as the local server is designated based on the device's performance capability. Performance capability can include factors such as network speed or latency, central processing unit (CPU) metrics, and/or others. In this way, for example, a device having best or ideal attributes for performing a given task (e.g., serving as a local server to communicate or stream content to other devices, e.g., the rest of the devices) can be selected.

In some embodiments, devices in the group can be allowed to directly request the digital content from a server. In this way, for example, in case of a local server not functioning as intended, data can still be streamed to the devices in the group without much interruption in a seamless manner.

Figure 7:
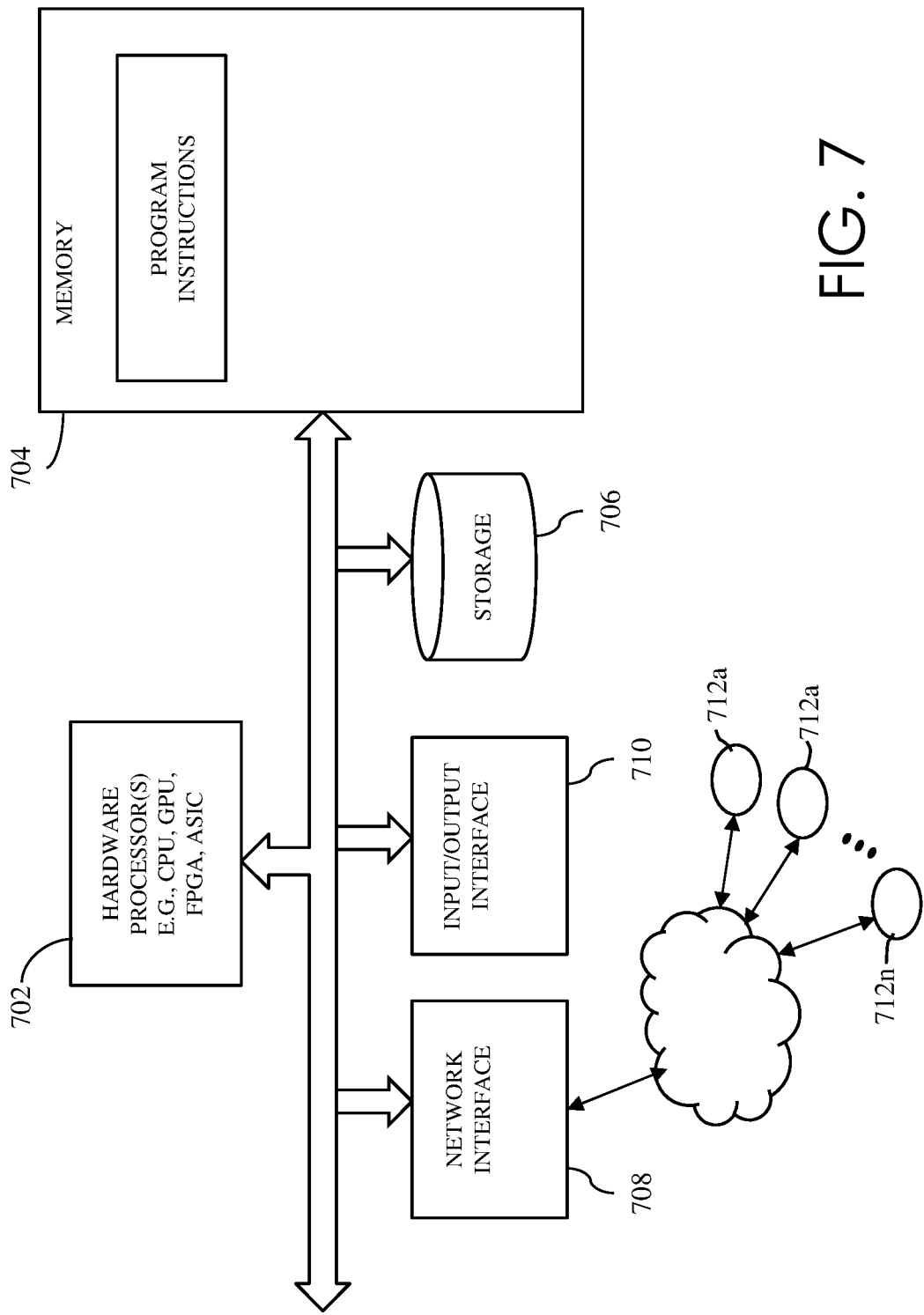
FIG. 7 is a diagram showing components of a system that can implement data transfer reduction in some embodiments.

FIG. 7 is a diagram showing components of a system that can implement data transfer reduction in some embodiments. One or more hardware processors 702 such as a central processing unit (CPU), a graphic process unit (GPU), and/or a Field Programmable Gate Array (FPGA), an application specific integrated circuit (ASIC), and/or another processor, may be coupled with a memory device 704, and effect data transfer reduction disclosed herein. A memory device 704 may include random access memory (RAM), read-only memory (ROM) or another memory device, and may store data and/or processor instructions for implementing various functionalities associated with the methods and/or systems described herein. One or more processors 702 may execute computer instructions stored in memory 704 or received from another computer device or medium. A memory device 704 may, for example, store instructions and/or data for functioning of one or more hardware processors 702, and may include an operating system and other program of instructions and/or data. One or more hardware processors 702 may receive requests from a plurality of devices 712a, ..., 712n for digital content for rendering in a virtual computer environment. Based on geographic locations of the plurality of devices 712a, ..., 712n, one or more hardware processors 702 may group the plurality of devices 712a, ..., 712n into at least one group. For a group in the at least one group, one or more hardware processors 702 may designate a device in the group as a local server, share information associated with the device designated as the local server with other devices in the group, e.g., the rest of the devices in the group, and transfer the digital content to the device designated as the local server for the device designated as the local server to share the digital content with the other devices in the group, e.g., the rest of the devices in the group. Data used by one or more processors 702 may be stored in a storage device 706 or received via a network interface 708 from a remote device, and may be temporarily loaded into a memory device 704 for operations of the one or more processors. One or more hardware processors 702 may be coupled with interface devices such as a network interface 708 for communicating with remote systems, for example, via a network, and an input/output interface 710 for communicating with input and/or output devices such as a keyboard, mouse, display, and/or others.

As described above, in some embodiments, a computer-implemented method can include receiving requests from a plurality of devices to render digital content in a virtual computer environment. The method can also include grouping at least some of the plurality of devices into a group based on a geographic location. The method can also include designating a device in the group as a local server. The method can also include sharing information associated with the local server with the group. The method can also include transferring the digital content to the local server for the local server to share the digital content with the group.

In some embodiments, the method may also include grouping another plurality of devices into a second group, and designating a second local server from the second group, where the second local server can share the digital content with the second group.

A system including at least one computer processor and at least one memory device coupled with the at least one computer processor is also disclosed, where the at least one computer processor is configured to perform one or more methods described above. A computer program product is also disclosed that includes a computer readable storage medium having program instructions embodied therewith, where the program instructions are readable by a device to cause the device to perform one or more methods described above.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in some embodiments" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
receiving requests from a plurality of devices for digital content for rendering in a virtual computer environment;
based on geographic locations of the plurality of devices, grouping the plurality of devices into at least one group; and
for a group in the at least one group,
designating a device in the group as a local server;
sharing information associated with the device designated as the local server with other devices in the group;
transferring the digital content to the device designated as the local server for the device designated as the local server to share the digital content with the other devices in the group; and
monitoring status of the device designated as the local server and responsive to detecting a problem with the device designated as the local server, designating another device in the group to act as the local server.

2. The computer-implemented method of claim 1, wherein the digital content includes augmented reality (AR) content.

3. The computer-implemented method of claim 1, wherein the digital content includes virtual reality (VR) content.

4. The computer-implemented method of claim 1, wherein the transferring of the digital content to the device designated as the local server includes, responsive to the other devices in the group establishing communication connections with the device designated as the local server, transferring the digital content to the device designated as the local server for the device designated as the local server to share the digital content with the other devices in the group.

5. The computer-implemented method of claim 1, wherein the device and the other devices in the group are organized into a tree-structure having a root node and descendant nodes stemming from the root node, wherein the root node represents the device designated as the local server, and the transferring of the digital content to the device designated as the local server includes transferring the digital content to the device represented by the root node, for the device represented by the root node to transfer the digital content to devices designated as root node's direct descendant nodes for the root node's direct descendants nodes to further share the digital content, wherein the digital content is shared between nodes in the paths along the tree-structure.

6. The computer-implemented method of claim 5, wherein the tree-structure's depth is determined based on telecast delay among devices in the group.

7. The computer-implemented method of claim 1, wherein the designating, the sharing and the transferring are performed for each group in the at least one group.

8. The computer-implemented method of claim 1, wherein sharing of the information associated with the device designated as the local server with the other devices in the group further includes triggering the other devices in the group to establish communication connections with the device designated as the local server.

9. The computer-implemented method of claim 1, wherein communication connections established between the device designated as the local server and at least one of the other devices in the group are non-Internet short-range communication connections and the digital content is shared via the non-Internet short-range communication connections.

10. The computer-implemented method of claim 1, wherein communication connections established between the device designated as the local server and at least one of the other devices in the group are intra-net connections.

11. The computer-implemented method of claim 1, wherein the device designated as the local server is designated based on the device's performance capability.

12. The computer-implemented method of claim 1, further allowing devices in the group to directly request the digital content.

13. A computer program product comprising a computer readable storage medium having program instructions embodied therewith, the program instructions readable by a processor to cause the processor to:
receive requests from a plurality of devices for digital content for rendering in a virtual computer environment;
based on geographic locations of the plurality of devices, group the plurality of devices into at least one group; and
for a group in the at least one group,
designate a device in the group as a local server;
share information associated with the device designated as the local server with other devices in the group;
transfer the digital content to the device designated as the local server for the device designated as the local server to share the digital content with the other devices in the group; and
monitor status of the device designated as the local server and responsive to detecting a problem with the device designated as the local server, designate another device in the group to act as the local server.

14. The computer program product of claim 13, wherein the digital content includes augmented reality (AR) content.

15. The computer program product of claim 13, wherein the digital content includes virtual reality (VR) content.

16. The computer program product of claim 13, wherein the device and the other devices in the group are organized into a tree-structure having a root node and descendant nodes stemming from the root node, wherein the root node represents the device designated as the local server, and the transferring of the digital content to the device designated as the local server includes transferring the digital content to the device represented by the root node, for the device represented by the root node to transfer the digital content to devices designated as root node's direct descendant nodes for the root node's direct descendants nodes to further share the digital content, wherein the digital content is shared between nodes in the paths along the tree-structure.

17. A system comprising:
at least one processor; and
at least one memory device coupled with the at least one processor;
the at least one processor configured to at least:
receive requests from a plurality of devices for digital content for rendering in a virtual computer environment;
based on geographic locations of the plurality of devices, group the plurality of devices into at least one group; and
for a group in the at least one group,
designate a device in the group as a local server;
share information associated with the device designated as the local server with other devices in the group;
transfer the digital content to the device designated as the local server for the device designated as the local server to share the digital content with the other devices in the group; and
monitor status of the device designated as the local server and responsive to detecting a problem with the device designated as the local server, designate another device in the group to act as the local server.

18. The system of claim 17, wherein the device and the other devices in the group are organized into a tree-structure having a root node and descendant nodes stemming from the root node, wherein the root node represents the device designated as the local server, and the transferring of the digital content to the device designated as the local server includes transferring the digital content to the device represented by the root node, for the device represented by the root node to transfer the digital content to devices designated as root node's direct descendant nodes for the root node's direct descendants nodes to further share the digital content, wherein the digital content is shared between nodes in the paths along the tree-structure.

19. The system of claim 17, wherein communication connections established between the device designated as the local server and the other devices in the group are non-Internet short-range communication connections and the digital content is shared via the non-Internet short-range communication connections.

* * * * *